though a high scatter cross-section so that collisions are frequent. This suggests that organic materials, particularly hydrocarbons, would be good moderating materials. A liquid hydrocarbon material can be used as a coolant as well as a moderator and serve a double purpose.

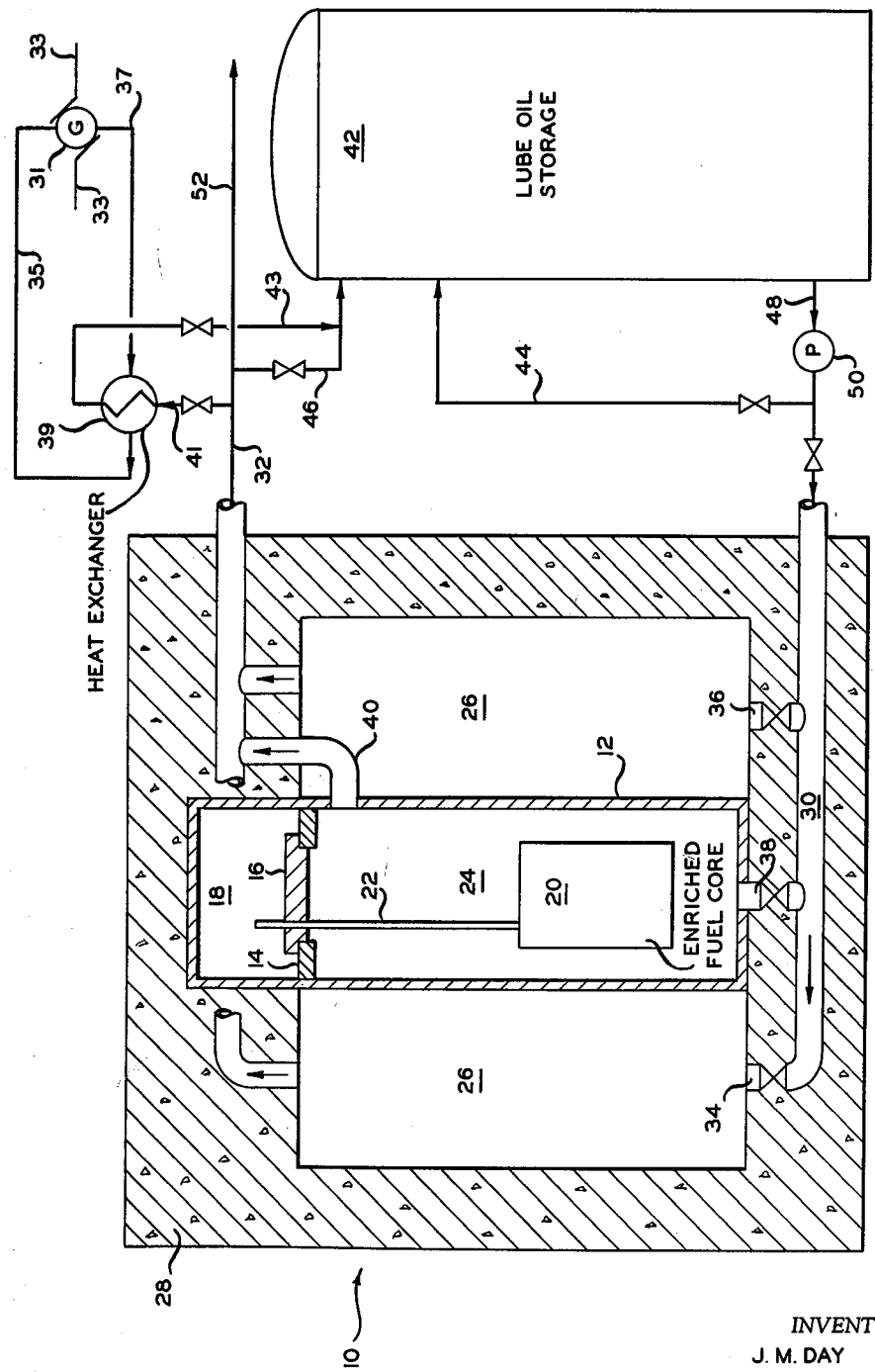

United States Patent Office 3,112,252
Patented Nov. 26, 1963

3,112,252
COLOR IMPROVEMENT OF LUBRICATING OILS
Charles E. Stoops, Bartlesville, Okla., and James M. Day, Princeton, N.J., assignors to Phillips Petroleum Company, a corporation of Delaware
Original application Aug. 15, 1956, Ser. No. 604,269, now Patent No. 3,007,859, dated Nov. 7, 1961. Divided and this application Jan. 11, 1960, Ser. No. 1,529
6 Claims. (Cl. 204—154)

This invention relates to novel atomic reactor construction and to the irradiation of liquid hydrocarbons, particularly lube oils and lube oil stocks.

This is a divisional application of our copending application S. N. 604,269, filed August 15, 1956, now U.S. Patent 3,007,859.

We have found a simplified atomic reactor construction which eliminates the conventional machined graphite blocks and graphite pebbles surrounding the active lattice of an atomic reactor. This is accomplished by utilizing a refined hydrocarbon oil as a moderator surrounding the tank in which the active lattice is positioned. We have also found that by subjecting certain lube oils to gamma radiation either in the area surrounding the lattice of a reactor or in the area adjacent the spent fuel elements from a nuclear reactor, a favorable decolorization of the lube oil is effected.

Accordingly, it is an object of the invention to provide a process for irradiating certain hydrocarbon lube oils and lube oil stocks. Another object of the invention is to provide a process for operating an atomic reactor utilizing hydrocarbon oil, such as a lube oil, as a moderator-coolant and as a reflector.

The development of atomic energy has resulted in the development of terminology peculiar to this particular field. In order to facilitate the understanding of the invention it is desirable to discuss and clarify some of the terms which are particularly applicable to the atomic energy field. The term "reactor" is applied to the physical means whereby a critical amount of radioactive material is positioned, inclosed, supported and shielded so as to be self-sustaining, i.e., the radioactive material and the environs return as many thermal neutrons per unit of time to the reactor core as are needed to produce the number of fissions per unit time from which they originally came. Obviously excess reactivity must exist in order to produce useful energy for a reasonably long period of time. This excess reactivity is controlled and introduced as fuel is burned by means of control rods.

The term fuel in an atomic reactor includes any of the heavy elements which are capable of undergoing the fission reaction.

Moderators are used so that the neutrons given up by the fission reaction in the fuel core as high energy or fast neutrons, may be slowed down and thereby reduced in energy to the so-called thermal or slow neutron range of energies. This is brought about by elastic collision with the atoms of the moderator, and each elastic collision removes a portion of the energy from the neutron in the form of kinetic energy imparted to the molecules of the moderator and which will eventually show up as heat. The best moderators are those having a low capture cross section, low atomic weight and relatively high scatter cross section, that is they are capable of undergoing many elastic collisions and of serving as a medium for neutron diffusion without capturing a neutron in the nucleus. Moderators may be liquids, solids, or gases. However, the latter form lacks sufficient density to be highly effective except at extreme pressures or with infinite space.

A reflector is a blanket of moderating material, surrounding the fuel core (consisting of fuel, moderator, coolant, and such structural material as necessary) which, by moderating and returning neutrons to the fuel core reduces the amount of fuel necessary for the reactor to support a self-sustaining fission reaction. It also serves as a reservoir of neutrons that can be used for useful purposes, such as the production of radioactive isotopes. In general, moderators and reflectors have the same requirements.

The properties which are necessary and desirable in a moderator are such that hydrogen, carbon, or compounds thereof qualify exceedingly well. None of these will be appreciably activated by irradiation and all have low atomic mass and tend to be very efficient in the absorption of energy from an energetic neutron. They also have a high scatter cross-section so that collisions are frequent. This suggests that organic materials, particularly hydrocarbons, would be good moderating materials. A liquid hydrocarbon material can be used as a coolant as well as a moderator and serve a double purpose.

Although it is impossible in a reasonable length of time to discuss all the ramifications in the choice of moderators and moderator-coolants, the advantages of the use of organic materials are sufficiently obvious to those familiar with the art that the Atomic Energy Commission is expending a large sum of money on an experimental organic moderated reactor. Such an expensive experiment is necessary because of problems stemming largely from the thermal and radiation instability or organic materials in general. A good discussion of some of the advantages of organic moderators and the instability problem and a summary of the Atomic Energy Commission supported laboratory investigations is given by R. G. Bolt and J. G. Carroll (Proceedings of the International Conference on the Peaceful Uses of Atomic Energy, vol 7, 546–555 (1956)). It is necessary to know the stabilities of many organic materials and to develop techniques for purifying those which are sufficiently stable to use. The latter is necessary because no organic material is completely stable to radiation; the most promising so far have been large aromatic molecules, such as polyphenyls and fused ring aromatics.

Advantages of our invention are that it substitutes relatively inexpensive lubricating oil for these expensive chemicals and eliminates the costly purification processes necessary to maintain these materials in a suitable state of purity. In addition, in the course of acting as a moderator and/or coolant, the oil is improved and processed to a more useful product. The lubricating oil can replace all of the moderating, cooling, and reflecting materials or, alternatively, only one or two of these functions may be served. It is important for economic reasons that temperatures be maintained below the boiling point of the lubricating oil. Operation at atmospheric pressure is thereby possible with consequent lighter construction permissible. It is also preferable to maintain atmospheric pressure in the reactor because of the possible escape of radioactive gases when super atmospheric pressures are employed.

Atomic reactors may be divided into many catagories for purposes of discussion. One means of classification is based on the configuration of the fuel elements in the reactor core. Such terms as homogeneous, heterogeneous, and fluidized, are typical examples. By "homogeneous reactor" one denotes a reactor in which the radioactive fuel is in solution in a moderating liquid. In heterogeneous reactors, the fuel is more or less in lumps, clusters of rods and such configurations separated by solid or liquid modifiers. Fluidized reactors, as the name suggests, indicates a reactor in which small particles of moderated fuel are fluidized by non-neutron absorbing gas such as helium and the like. This type of reactor is in the experimental stage and little more information is available. Another classification deals with the type of moderator used, thus we have terms such as light water, heavy water, graphite, and organic, to describe moderated reactors in each of the above fuel configuration categories. Another type of classification relates to the particular type of fuel element used. Examples are natural uranium, enriched uranium, thorium, and plutonium. Occasionally, such terms as "swimming pool" and "water boiler" are used as further means of identification. These terms refer to similarity of the reactor to well-known structures and phenomena. Another means of identification is based on the use of the reactors, such as power reactors, test reactors, and breeder reactors. Breeder reactors are those in which as much or more nuclear fuel is produced as consumed.

Within the reactor core, the fissioning fuel constantly gives off fast neutrons, gamma rays, and radioactive fission products. The fast neutrons, the prompt gamma rays from the fission process, and the gamma and beta rays from the radioactive fission products are collectively known as ionizing radiation because directly or indirectly in their passage through matter their energy is dissipated by the formation of ion pairs and activated molecules. These ion pairs and activated molecules are responsible for the chemical effects that lead to the degradation of organic compounds. The term ionizing radiation also includes high energy ionic particles such as protons, deutrons, alpha particles etc. which are not of primary importance in a discussion of reactors, but which might be of importance in the treatment of organic compounds such as lubricating oils. The high energy fission fragments, themselves, are ionizing radiation but are usually retained in the fuel alloy and hence have no effect on the moderator.

The present invention utilizes a hydrocarbon oil as the moderator-reflector, as a portion of the moderator, or as a portion of the reflector in any of the experimentally proven reactors. This is possible because of the low capture cross-section of both the carbon and hydrogen atoms present in the hydrocarbon oil. Graphite, which is pure carbon, is an exceptionally good moderating and reflecting material and hydrogen under high pressure or at low temperatures would also be an excellent moderator or reflector. However, both conditions necessary for its use are extremely difficult to obtain in the reactors under discussion. However, when combined with carbon in the form of hydrocarbons, as in this invention, the resulting material possesses the desirable properties of both carbon and hydrogen and has the advantage that it is a liquid and lends itself to the shape of the container at normal temperatures or pressure, whereas carbon must be shaped by expensive machine methods and the hydrogen properties as noted above are completely outside the realm of consideration. The invention also comprises improving the color characteristics of a lube oil by subjecting the oil to gamma radiation from a reactor or spent fuel, or other ionizing radiation.

In order to provide a more complete understanding of the invention reference is made to the schematic drawing which shows a vertical cross-section of a reactor for utilizing the invention.

Referring to the drawing, reactor 10 comprises a central tank 12 closed near the upper end by a lead partition 14 including a lead plug 16. Partition 14 provides a shielded operating room 18 above reactor fuel core 20 which is controlled by means of control rod 22 from room 18. Tank 12 below partition 14 is filled with a suitable moderator 24 consisting essentially of a hydrocarbon oil, such as lube oil. Reflector compartment 26 is encased in and completely surrounded by a concrete shield 28.

Compartment 26 and tank 12 (below partition 14) are filled with lube oil and conduits 30 and 32 are connected with the lower and upper ends of compartment 26 for introducing and removing oil, respectively, to and from, compartment 26. Control of oil flow is effected by remote operation of valves 34 and 36. Valve 38 and conduit 40 provide oil circulation means thru tank 12 around fuel core 20. Conduits 30 and 32 are connected to a lube oil storage tank 42 by means of valved conduits 44 and 46. A conduit 48 provided with a pump 50 circulates oil from the storage tank thru the reactor compartments and back to tank 42. Lube oil of improved characteristics may be drawn off as desired thru valved conduit 52.

A fluid turbine-operated electrical generator 31, having leads 33, is connected by fluid conduits 35 and 37 to an indirect heat exchanger 39 which in turn is connected with oil lines 32 and 46 by means of conduits 41 and 43, respectively, so as to provide heat exchange with the hot oil and fluid power for the turbine of generator 31. It is also feasible to supply fluid power from heat exchange within tanks 12 and/or 26.

More complete details of the reactor construction are provided in the aforesaid application and will not be repeated here.

When spent fuel assemblies are removed from the reactor and placed in the canal storage rack, they have a very high gamma radiation coming mainly from the decay of fission products and when immersed in water the gamma radiation from a single fuel element, measured at a point 10 centimeters from the fuel element, shows an initial gamma intensity of $3 \times 10^6$ r. per hour and decays to $10^5$ r. per hour in approximately 120 days. On the center line of the storage rack, the initial gamma intensity is $10^7$ r. per hour which decays in about 20 days to $3 \times 10^6$ r. per hour. At that time, another group of spent fuel elements is removed from the reactor and upon replacing the original spent fuel elements, the intensity is again raised to $10^7$ r. per hour so that gamma intensity in the range $10^7$ to $3 \times 10^6$ r. per hour is readily available on a continuous basis during the normal operation of a reactor such as the MTR.

Preliminary to a detailed description of a specific example relating to irradiation of lubricating oil, a discussion of lubricating oils will be helpful and, in particular, the preparation of the lubricating oil which is the subject of the specific irradiation of the invention.

Lubricating oils from petroleum are predominantly of high (350–800 or higher) molecular weight. The various types may be named in accordance with the type of crude from which they originate. West Coast, Mid-Continent, and Pennsylvania designate the three major types found in the United States. Pennsylvania crude is predominantly paraffinic in character, Mid-Continent is predominantly asphaltic in character and the West Coast is even more asphaltic with the added character of having considerable amounts of non-hydrocarbon impurities containing sulfur and nitrogen. After careful examination of a Mid-Continent crude, the U.S. Bureau of Standards drew the conclusion that the lube oil fraction is made up of 4,000 n constituents. This is based on laborious distillations made at the Bureau of Standards' Laboratory wherein the lube oil was cut up into 4,000 fractions having different properties and each fraction comprising more than one constituent. It is believed that the factor n is probably a small number greater than one, although its magnitude has not been established. From their findings, it is believed that attempts to speak of lubricating oils in other than very broad terminology is futile.

For good lubricating properties in modern motor cars, an oil must have proper viscosity and high broad viscosity index. It has been found that these properties are present in fractions composed predominantly of compounds containing a naphthenic nucleus with long paraffinic side chains. The more asphaltic crudes trend toward mixed naphthenic-aromatic nuclei. Long paraffinic side chains mask the effects of the aromatics when measuring such properties as viscosity index and pour point; however natural formation of the constituents in crude oils appears to favor ring formation at the expense of side chains; and accordingly, the asphaltic crudes contain multi-ring nuclei having varying degrees of unsaturation.

Solvent extraction has largely replaced fractionation for the final separation and preparation of lubricating oil base stocks from crude. The solvents utilized are usually selective for the more aromatic or unsaturated hydrocarbons and therefore yield a raffinate phase richer in the paraffinic and naphthenic stocks, which have desirable lubricating oil properties. As pointed out above, long paraffinic side chains are capable of masking unsaturation; and accordingly, small amounts of unsaturates (aromatic and/or olefinic) are present in lubricating oil base stocks. These compounds are one of the causes of color observed in lubricating oils and may along with related impurities be responsible for the bloom (green fluorescence) of lubricating oil stocks.

As an example of the process utilized in preparing the feed stock of this specific example, a description will now be given for the preparation of SAE 250 lubricating oil base stock from a Mid-Continent crude. After an original flashing, de-salting, and de-emulsification of the raw crude, the material is charged to a topping still wherein gasoline and light gas oils are removed therefrom. The residue is vacuum distilled to remove heavy gas oil and light lubricating oils of SAE 10 viscosity and SAE 20 viscosity grades. The residue is then subjected to fractionation in the presence of propane to take overhead a fraction having 100 SUS at 210° F. viscosity, and also a second fraction having a viscosity of about 200 SUS at 210° F. The latter fraction is phenol extracted to produce a less aromatic raffinate which is propane dewaxed to produce a 250 SAE lubricating oil base stock.

A portion of this lube oil base stock was placed in the irradiation container of an MTR. The MTR used is a thermal neutron reactor using enriched-uranium as fuel, ordinary water as both moderator and coolant, and beryllium as reflector. It is designed to operate at 30,000 kilowatts. Because of its high specific power, average neutron fluxes of $2 \times 10^{14}$ thermal neutrons per square centimeter per second and $1 \times 10^{14}$ fast neutrons per square centimeter per second are available. Peak thermal neutron fluxes of $5 \times 10^{14}$ neutrons per square centimeter per second exist in certain positions in the reflector. The container was lowered through the water in the canal at the MTR gamma facility into the center of an array of spent fuel elements. Three samples were utilized in order to determine the effect of various dosages of gamma radiation. The first dosage required approximately 10 minutes in the gamma facility to obtain a dosage of $10^6$ r. units. A second portion was irradiated one hour to obtain a dosage of $10^7$ r. units and a third portion was irradiated for 10 hours to obtain a dosage of $10^8$ r. units. The following data were obtained on the samples before and after irradiation.

|  | Irradiation Dose | | | |
| --- | --- | --- | --- | --- |
|  | Unirradiated | $10^6$ rep.* | $10^7$ rep.* | $10^8$ rep.* |
| Viscosity | | | | |
| (SUS, 210° F.) | 205.6 | 204 | 206.5 | 225.4 |
| (SUS, 100° F.) | 4,100 | 4,008 | 4,160 | 4,639 |
| Viscosity Index | 96 | 97 | 96 | 98 |
| Specific Gravity (60/60 F API) | 24.5 | 24.7 | 24.7 | 24.5 |
| Color (NPA) | 6 |  | 4.5 | 4.5— |
| Carbon Residue | 1.33 | 1.08 |  |  |

*rep. (Roentgen equivalent physical) is a unit for measuring dosage and represents an absorption of radiant energy of 93 ergs per gram.

These results show that lubricating oils are very little affected, other than by color improvement, by high gamma flux such as is encountered in high energy atomic reactors similar to the MTR. They are also highly resistant to the absorption of neutrons at all energy levels encountered in all known types of atomic reactors. Therefore, the present invention comprises not only the improvement in color of lubricating oils by irradiating same in a gamma facility, but also the use of such highly unreactive hydrocarbons in the moderating and reflecting zones of atomic reactors to take advantage of their versatility as moderators and cooling agents. To take the example of the MTR reactor, the use of lubricating oils in the permanent graphite section is advantageous because expensive machining of the graphite blocks is eliminated and no such costly purification, as required in preparing the graphite to remove traces of boron (which represents the predominant part of the cost of the raw graphite used to make the machined pieces of the permanent moderator), is required in the case of lubricating oils because they are already completely purified and are free of "poisons." In utilizing lubricating oils as coolant in the tank section, the reactor is preferably designed to operate at relatively low temperatures although temperatures as high as 700 to 900° F. can be tolerated because lubricating oils are made to operate under such conditions and have been tailored to contain only highly refractory hydrocarbon types. It is preferred to operate under temperature conditions wherein the lube oil does not become heated to over 700° F. but temperatures as high as 900° F. can be tolerated where the oil is circulated thru the reactor without excessive residence time therein. In fractionating a 250 Kansas City base stock at 925° F. it was found that a first fraction representing less than 10% of the base stock was obtained.

Certain modifications of the invention will become apparent to those skilled in the art and the illustrative details disclosed are not to be construed as imposing unnecessary limitations on the invention.

We claim:

1. A process for decolorizing refined 50 to 250 weight (SAE) lube oil having an NPA color of at least 3.5 which comprises subjecting said oil to total atomic reactor radiation in a dosage of $10^6$ to $10^{10}$ rep. units so as to substantially reduce said NPA color.

2. The process of claim 1 wherein the dosage is $10^7$ to $10^9$ rep. units.

3. The process of claim 1 wherein the source of radiation comprises spent fuel elements from an MTR type reactor.

4. The process of claim 1 applied to a lube oil having an NPA color of at least 4.

5. A process for decolorizing a refined 50 to 250 weight (SAE) lube oil having an NPA color of at least 3.5 which comprises subjecting said oil to a source of radiation comprising fission products from an atomic reactor so as to subject said oil to a radiation dosage in the range of $10^6$ to $10^{10}$ rep. units whereby said NPA color is substantially reduced.

6. A process for decolorizing refined 50 to 250 weight (SAE) lube oil having an NPA color of at least 3.5 which comprises maintaining a body of said oil as a moderator-coolant in a tank in an atomic reactor surrounding a fission-sustaining lattice containing fissionable material; maintaining a body of said lube oil as a reflector in a compartment surrounding said tank; maintaining a body of said oil in a storage vessel outside of said compartment and tank; circulating said oil from said tank thru said compartment and thru said tank; returning oil from said compartment and said tank to said vessel; subjecting said oil to radiation from said reactor in substantial dosage during circulation to decolorize said oil; and withdrawing decolorized oil as product.

References Cited in the file of this patent

UNITED STATES PATENTS 2,845,388    Black et al.            July 29, 1958

FOREIGN PATENTS 665,263    Great Britain            Jan. 23, 1952

OTHER REFERENCES

Martin: Chemical and Engineering News, vol. 33, No. 14, Apr. 4, 1955, pages 1424–1428.